US005684545A

United States Patent [19]
Dou et al.

[11] Patent Number: 5,684,545
[45] Date of Patent: Nov. 4, 1997

[54] ADAPTIVE OPTICS WAVE MEASUREMENT AND CORRECTION SYSTEM

[75] Inventors: Rensheng Dou; Michael K. Giles, both of Las Cruces, N. Mex.

[73] Assignee: New Mexico State University Technology Transfer Corp., Las Cruces, N. Mex.

[21] Appl. No.: 499,703

[22] Filed: Jul. 7, 1995

[51] Int. Cl.⁶ .................................................. G02F 1/137
[52] U.S. Cl. ............................ 349/1; 349/116; 356/345; 356/355
[58] Field of Search ........................... 250/201.9, 204, 250/550; 359/72, 93, 94, 578, 579, 560–561; 356/345, 351, 354, 355, 356, 358, 359, 360; 349/116.1

[56] References Cited

U.S. PATENT DOCUMENTS

| | | | |
|---|---|---|---|
| 4,340,304 | 7/1982 | Massie | 356/351 |
| 4,399,356 | 8/1983 | Feinleib et al. | 250/201 |
| 4,670,646 | 6/1987 | Spivey | 250/201 |
| 4,682,025 | 7/1987 | Livingston et al. | 250/201.4 |
| 4,695,973 | 9/1987 | Yu | 364/822 |
| 4,740,677 | 4/1988 | Carreras et al. | 250/201 |
| 4,791,584 | 12/1988 | Greivenkamp, Jr. | 364/525 |
| 4,833,314 | 5/1989 | Pepper et al. | 250/201 |
| 4,865,454 | 9/1989 | Lazzarini et al. | 356/359 |
| 4,943,709 | 7/1990 | Grinberg et al. | 250/201.9 |
| 5,026,977 | 6/1991 | Hubbard, Jr. | 250/201 |
| 5,042,949 | 8/1991 | Greenberg et al. | 356/359 |
| 5,042,950 | 8/1991 | Salmon, Jr. | 356/353 |
| 5,113,282 | 5/1992 | O'meara et al. | 359/241 |
| 5,120,128 | 6/1992 | Ulich et al | 356/121 |
| 5,129,058 | 7/1992 | Mifune et al. | 395/162 |
| 5,253,033 | 10/1993 | Lipchak et al. | 356/5 |
| 5,276,737 | 1/1994 | Cohn | 364/822 |

OTHER PUBLICATIONS

Berreman, D.W., "Dynamics of Liquid–Crystal Twist Cells" *Applied Physics Letters*, vol. 25, No. 1, pp. 12–15 (Jul. 1, 1974).

Bonaccini, D., et al., "Adaptive Optics Wavefront Corrector Using Addressable Liquid Crystal Retarders," *SPIE, Current Developments in Optical Engineering IV*, vol. 1334, pp. 89–97 (1990).

Bonaccini, D., et al., "Adaptive Optics Wavefront Corrector Using Addressable Liquid Crystal Retarders: II", *SPIE Active and Adoptive Optical Components*, vol. 1543 pp. 133–143 (1991).

Horwitz, B.A., et al., "Multiplex Techniques for Real–Time Shearing Interferometry," *Optical Engineering*, vol. 29, No. 10, pp. 1223–1232 (1990).

Kirsch, J.C., et al., "Modulation Characteristics of the Epson Liquid Crystal Television," *Optical Engineering*, vol. 31, No. 5, pp. 963–967 (May 1992) [p. 6 unavailable].

Roddier, F., "Variations on a Hartman Theme," *Optical Engineering*, vol. 29, No. 10, pp. 1239–1242.

Thompson, L.A., "Adaptive Optics in Astronomy," *Physics Today*, pp. 24–31 (Dec. 1994).

Chapter From Textbook, 18.3 "Electro–Optics of Liquid Crystals" pp. 721–727.

*Primary Examiner*—William L. Sikes
*Assistant Examiner*—James A. Dudek
*Attorney, Agent, or Firm*—Deborah A. Peacock; Jeffrey D. Myers

[57] ABSTRACT

An adaptive optics system which simultaneously measures the phase function and corrects the phase distortion of a wavefront using a liquid crystal device placed in an interferometer. The liquid crystal device inserts the conjugate phase function in the path and obtains a null in the interference pattern.

24 Claims, 19 Drawing Sheets

ADAPTIVE OPTICS WAVE MEASUREMENT AND CORRECTION SYSTEM

BACKGROUND OF THE INVENTION

1. Field of the Invention (Technical Field)

The present invention relates to adaptive optics systems which measure and modulate the phase distortion of a wavefront in a closed loop system using a liquid crystal device (LCD).

2. Background Art

Adaptive optics systems have been used to compensate for input signal phase distortions. The current approach consists of measuring local wavefront slopes and reconstructing the wavefront from its slopes. Present technology requires a separate wavefront measurement system such as a shearing interferometer or a Hartman sensor and a separate deformable mirror for wavefront correction. Some of these systems are described in "Adaptive Optics In Astronomy" (Thompson, Physics Today, December 1994, p. 24).

Adaptive optic systems using an addressable liquid crystal retarder as the wavefront corrector are also known, as described in "Adaptive Optics Wavefront Corrector Using Addressable Liquid Crystal Retarders" (Bonnaccini, et. al., SPIE Proc. Vol. 1334, page 89, 1990) and in "Adaptive Optics Wavefront Corrector Using Addressable Liquid Crystal Retarders: II" (Bonnaccini, et. al., SPIE Proc. Vol. 1543, page 133, 1991). Typically, these systems involve measuring the phase distortions of an input signal against a known reference signal, and then correcting the distortion of the input signal based on these measurements. In these systems, the reference signal is split from the input signal and taken outside of the refractory system for measurement by separate components before an adjustment is made to a component within the system which corrects the signal phase distortion.

A similar example is taught in U.S. Pat. No. 4,943,709, entitled Liquid Crystal Adaptive Optics System, to Grinberg, et al. This system is used to measure the distortion of an input beam from a satellite, such that an output beam transmitted to the satellite can be adjusted to account for atmospheric turbulence, allowing the satellite to receive a clear signal. As with typical adaptive optics systems, the Grinberg invention requires the input beam to have a known wavefront in order to determine the correction factor to be applied to the transmitted beam. Also, as is typical, the Grinberg invention detects the distortion of the input beam outside of the refractory system using separate components and then feeds the correction factor to another separate component to adjust the transmitted beam.

Other references, such as U.S. Pat. No. 5,253,033 to Lipchak, et al., and U.S. Pat. No. 5,120,128, to Ulich, et al., use some type of LCD, but do not use the LCDs to simultaneously measure and correct the wavefront distortion.

SUMMARY OF THE INVENTION

The present invention comprises apparatuses and methods for adapting a wave. The invention comprises: providing an input wave; directing the input wave through a variably distorting mechanism and to a detector; detecting an irradiance and determining a phase of the input wave via the detector; analyzing the detected phase of the input wave; and variably distorting the phase of the input wave.

In the preferred embodiment, the input wave is a collimated wave, or more preferably a collimated laser. Directing the input wave preferably comprises a refractory system for splitting the wave into identical waves; reflecting the identical waves off of reflecting devices to a common point; passing one of the identical waves through a phase object and then a liquid crystal device before the wave reaches the common point; recombining both identical waves at the common point of reflection to form an interference wave; and, relaying the interference wave to the detector.

Detecting an irradiance and determining a phase of the input wave is preferably accomplished by the detector sensing the phase of the input wave and outputting a signal corresponding to the sensed phase of the input wave. The detected phase of the input wave is analyzed by a data processor receiving the detector output signal corresponding to the sensed phase of the input wave; calculating the conjugate function of the sensed phase; and outputting a signal corresponding to the calculated conjugate function. The phase of the input wave is variably distorted by the liquid crystal device which changes its refractive index in response to the signal sent by the data processor. The adaptive optics system may also include a wave propagation device, preferably a laser.

In an alternative embodiment, the invention comprises providing a collimated input wave; splitting the input wave into two waves; reflecting the waves toward a common point; passing one of the two waves through a phase object before reaching the common point, thereby distorting the wave; passing the distorted wave through a liquid crystal device before reaching the common point, thereby modifying the phase of the wave; recombining the split waves at the common point, thereby creating an interference wave; imaging the interference wave to a detector; detecting the phase of the interference wave with the detector; outputting a signal containing the detected phase of the interference wave from the detector; analyzing the detector output to determine the conjugate wave phase; sending a signal of the conjugate wave phase from the data processor; and receiving the sent signal from the data processor with the liquid crystal device, causing the refractive index of the liquid crystal device to change, thereby modifying the phase of the wave.

The preferred liquid crystal device utilized in the present invention is an LCD. Preferably, the liquid crystal device comprises a pixel array having individual pixels, wherein each of the pixels is electrically driven. The liquid crystal device further comprises liquid crystals in a fluid state of matter with orientation order having optical qualities of a uniaxial crystal. The liquid crystals respond to the electrically driven pixels causing a refractive index to change. The orientation order of the liquid crystal device can be parallel to the pixel array, rotating at all angles so that it can go to perpendicular to the pixel array. Likewise, the liquid crystal device is preferably able to rotate through all angles. Accordingly, one can get a tilt and spin effect.

An object of the present invention is to simultaneously measure and correct the phase distortion of a distorted input wave.

An advantage of the present invention is to perform the measurement and correction of the distorted input wave with the same components.

A further advantage of the present invention is that the reference wave does not need to be a perfect plane wave.

Another object of the invention is that many different types of waves can be measured and corrected.

Yet another advantage of the present invention is that there are many different interferometer types that can be used to implement this invention.

BRIEF DESCRIPTION OF THE DRAWINGS

The accompanying drawings, which are incorporated into and form a part of the specification, illustrate the preferred embodiment of the present invention and, together with the description, serve to explain the principles of the invention. The drawings are only for the purpose of illustrating a preferred embodiment of the invention and are not to be construed as limiting the invention.

DESCRIPTION OF THE PREFERRED EMBODIMENTS (Best Modes for Carrying Out the Invention)

The present invention is an adaptive optics system comprising a single component which, in a closed loop interferometer system, makes it possible to simultaneously measure wavefront distortion and corrects it. For purposes of the specification and claims, the term "optics" includes any wave that can be distorted and corrected.

The present invention can be used for testing the optical quality of lenses and mirrors, among other objects. Also, the present invention can be used to compensate for atmospheric distortions (e.g., common in solar imaging and other celestial observations). Further, the present invention is useful in the sensing and correction of distortions in laser beams, including high energy laser beams.

Figure 1:
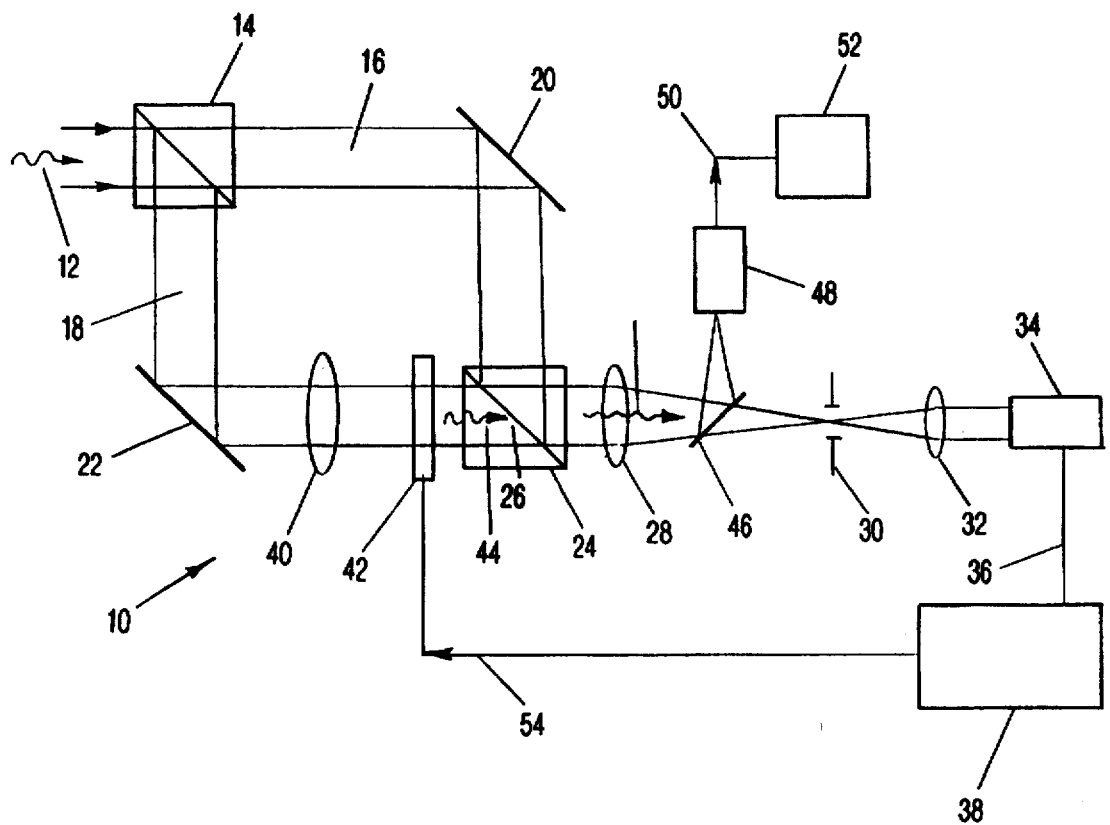
FIG. 1 shows the preferred embodiment for a closed loop adaptive optic system using a liquid crystal device as a phase retarder.

With reference to FIG. 1, the preferred system of the present invention uses an LCD placed in one path of a Mach-Zehnder type interferometer 10 to measure the phase variation across a wavefront. The arrows indicate the direction of the wavefront. In the basic interferometer 10, an input wave 12 from source 8, preferably collimated, passes through a splitter 14 and is divided into plane waves 16 and 18 which are reflected by mirrors 20 and 22, respectively. The reflected plane waves 16,18 are then recombined by another beam splitter 24 so that the two plane waves 16,18 interfere with each other. The resultant recombined interference wave 26 is focused by a lens 28 through a spatial filter 30 and imaged through lens 32 onto a camera 34. Camera 34 records the interferogram and sends it as a signal representing the phase difference between wave 16 and distorted plane wave 44, to a computer or neural network 38 which analyzes signal 36 to obtain the phase difference.

In the preferred embodiment of the present invention, a phase object 40 and a liquid crystal device (LCD) 42, preferably a liquid crystal television (LCD) comprising an electrically addressable pixel array, are inserted in one of the two reflected plane wave paths, thus creating the distorted plane wave 44. Assuming distorted plane wave 44 has phase function $\Phi(x,y)$ at the plane of LCD 42, and taking plane wave 16 from the other path as a reference plane wave, the squared modulus of interference wave 26 resulting from recombining the two waves 16 and 44, commonly called the interferogram, can be detected by camera 34, preferably a charged coupled device (CCD) camera, located at the conjugate plane to LCD 42. The point spread function can also be displayed on monitor 52 after being split 46 and detected by camera 48 which sends a signal 50 to monitor 52. The interferogram at camera 34 maps the phase difference variation across the interference wavefront at the plane of the LCD directly.

When distorted plane wave 44 described by a wave function $u(x,y)=Ae^{i\Phi(x,y)}$, where A is constant and $\Phi(x,y)$ is the phase function of the phase object, interferes with plane wave 16 of constant amplitude B, the irradiance detected on camera 34 is:

$$I(x,y) = |u(x,y) + B|^2 = (Ae^{j\Phi(x,y)} + B)(Ae^{-j\Phi(x,y)} + B)$$
$$= C_1 + C_2\cos[\Phi(x,y)]$$

where $C_1=|A|^2+|B|^2$ and $C_2=2AB$ are constants. For the detected fringe pattern, the highest irradiance $I_h$ happens where phase $\Phi(x,y)=0$ with $I_h=C_1+C_2$ and the lowest irradiance $I_l$ occurs where phase $\Phi(x,y)=n$ with $I_l=C_1-C_2$ (assuming the phase variation across the wavefront is larger than or equal to n). The resulting equation is:

$$\frac{I(x,y)-I_l}{I_h-I_l} = \frac{C_2(1+\cos[\Phi(x,y)])}{2C_2} = \frac{1+\cos[\Phi(x,y)]}{2}$$

Since the quantities $I_h$, $I_l$, and $I(x,y)$ can be measured, the phase function is obtained by:

$$\Phi(x,y) = \pm\cos^{-1}\left(2\frac{I(x,y)-I_l}{I_h-I_l} - 1\right)$$

The phase function is proportionally related to the phase shift and driven gray level of the particular LCD being used. This relationship can be determined and then used with the phase function to update the gray level to correct the phase distortion and erase all fringes. Since there are two possible update gray levels, both updates are used and the one which produces the larger detected irradiance $I(x,y)$ is chosen as the update value at each position (x,y).

Data processor 38 evaluates signal 36 from camera 34 using the above equations. After calculating a result, data processor 38 sends a signal 54 to LCD 42, driving it with the conjugate function to correct the distortion or aberration. The end result after correction is an approximately uniform bright irradiance across camera 34 and monitor 52, corresponding to the single bright fringe obtained when two perfect untilted plane waves interfere with each other.

Figure 8:
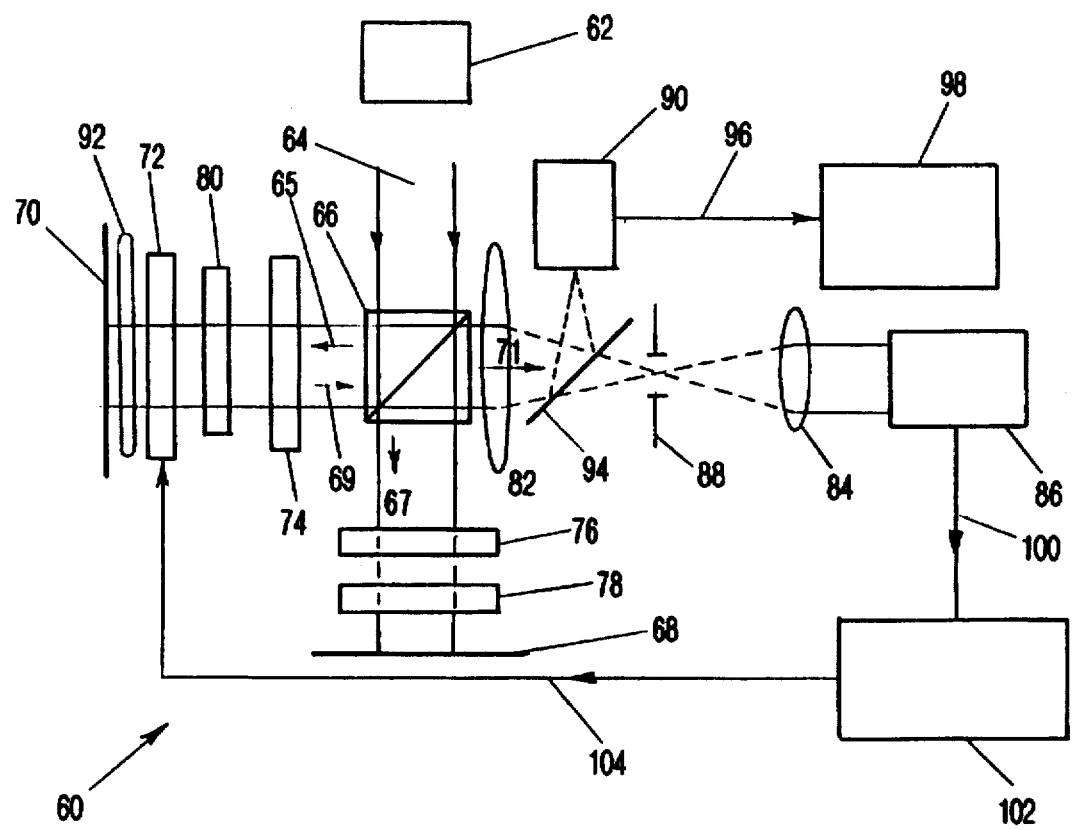
FIG. 8 is a diagram of a Twyman-Green interferometer for measuring the phase function of a phase object.
Figure 9A:
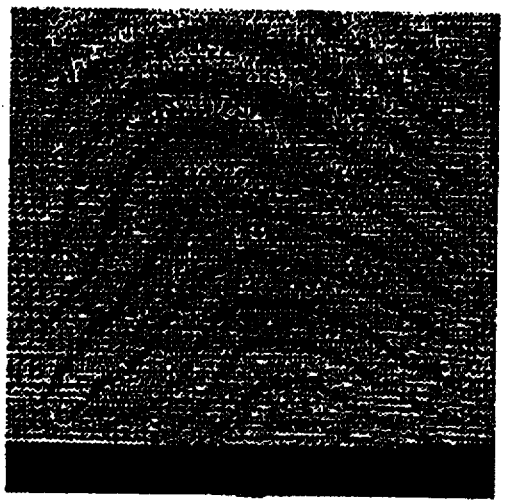
FIGS. 9(a)–9(d) show the calibration measurement of the experimental system: (a) the interference fringes of the optical system; (b) interference pattern after correction by driving the LCD; (c) the driven pattern on the LCD; and (d) the 3-D plot of the phase conjugate.
Figure 9B:
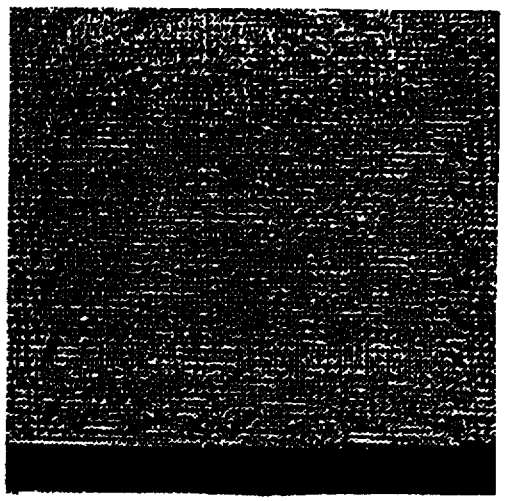
Figure 9C:
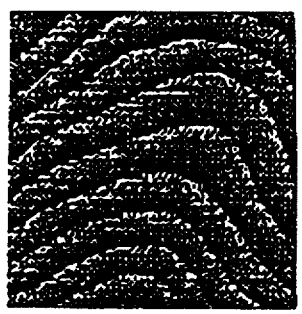
Figure 9D:
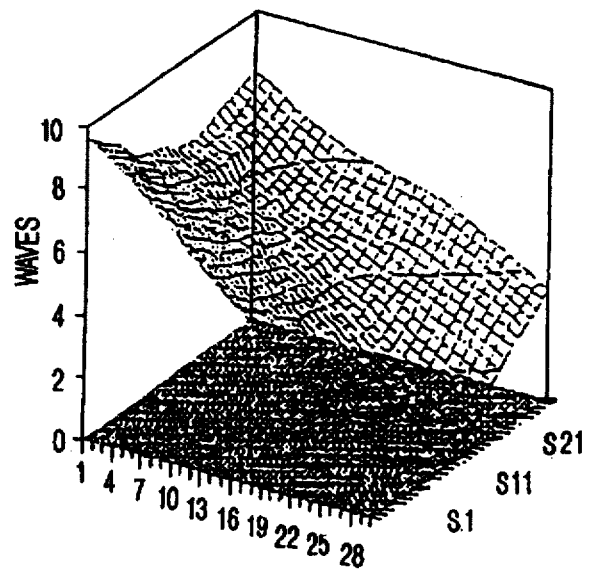

With reference to FIG. 8, an alternate embodiment of the present invention, an LCD 72 is placed in one path of a Twyman-Green type interferometer 60 to measure the phase variation across an interference wave. In this embodiment, one of the two waves split from the input wave passes through the phase object 92 twice.

An input wave 64, preferably collimated and polarized, is split into two waves, 65 and 67, by a splitter 66, preferably a polarized splitter. One of these two waves, wave 67 in this embodiment, is used as a reference wave. These two waves 65, 67 are reflected back by two reflectors 70 and 68, respectively, and recombined by splitter 66. This arrangement forms a Twyman-Green interferometer, and LCD 72 is inserted in one of the two paths of the interferometer. A twisted angle effect of LCD 72 is avoided in this arrangement because the polarized wave passes through LCD 72 twice so that the polarization of the wave after the double pass through is the same as the polarization of the wave incident on the LCD. When this reflected and distorted wave 69 arrives at splitter 66, it is mostly reflected in the direction of input wave source 62 due to the polarization property of splitter 66. The same situation happens for the other path except there is no LCD inserted. Therefore interference wave 71 is very weak in the direction of detectors 86 and 90 because the major intensity goes back to the incident direction of input wave source 62. The wave intensity can be increased by setting up two polarizers 74 and 76 at 45°, allowing more of recombined wave 71 to arrive at cameras 86 and 90, respectively, through splitters 66 and 94.

Polarizer 78 is used for adjusting the intensity of reference wave 67 to obtain the best contrast of the interference fringes. A halfwave plate 80 is inserted between polarizer 74 and LCD 72 to align the polarization of incoming wave 65 to the direction of the director of LCD 72 to achieve maximum phase retardation properties. Lenses 82 and 84, preferably positive lenses, image LCD 72 on cameras 86 and 90. Spatial filter 88 filters away the repeated high diffraction orders due to the pirelated structure of LCD 72. Cameras 86 and 90, preferably CCD cameras, are used to detect the interference pattern and the point spread function, respectively, of wave 71. Phase object 92 is the object whose distortion is measured and corrected.

After detecting the point spread function of interference wave detector 90 sends a signal 96 to a monitor 98, which displays it. Similarly, detector 86 sends a signal 100 representing the detected interference pattern to data processor 102. Data processor 102 performs the functions described above to determine the conjugate phase function of interference wave 71. This signal 104 of the conjugate wave function is sent to LCD 72 to correct interference wave 71.

Figure 12:
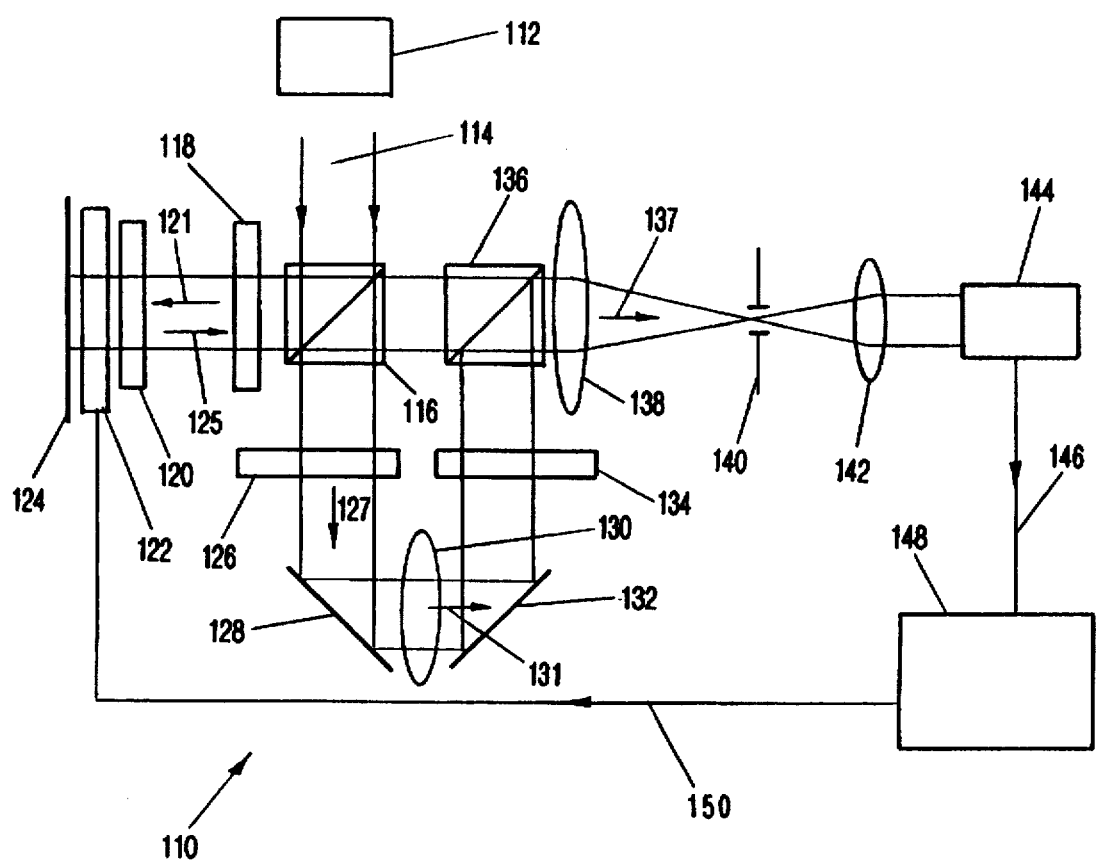
FIG. 12 is a diagram of a modified Twyman-Green interferometer for measuring the phase function of a phase object in a single pass.
Figure 13A:
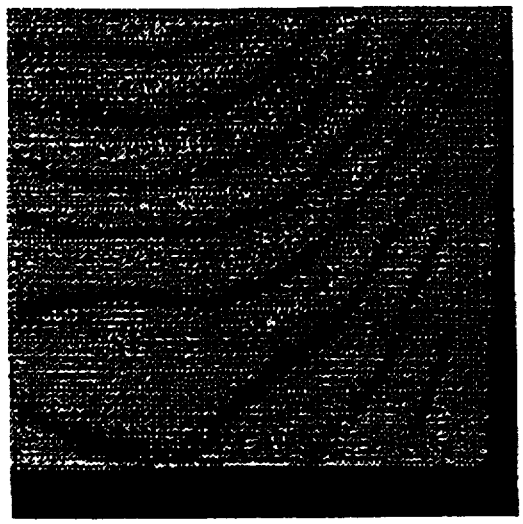
FIGS. 13(a)–13(d) show the calibration measurement of the experimental system: (a) the interference fringes of the optical system; (b) interference pattern after correction by driving the LCD; (c) the driven pattern on the LCD; and (d) the 3-D plot of the phase conjugate.
Figure 13B:
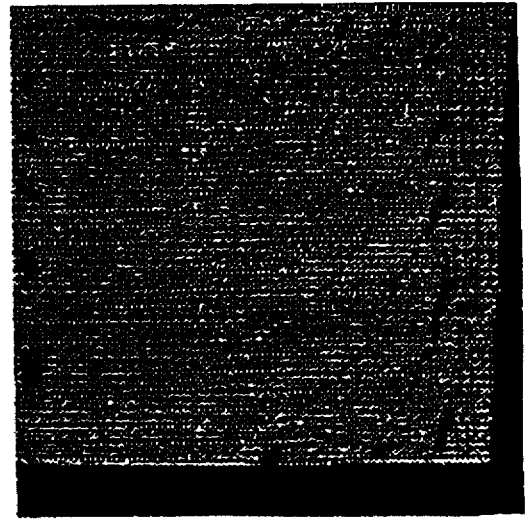
Figure 13C:
Figure 13D:
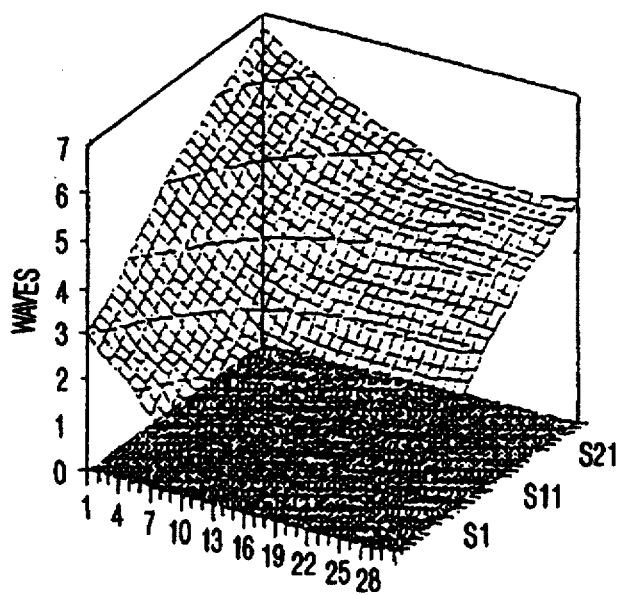
Figure 14A:
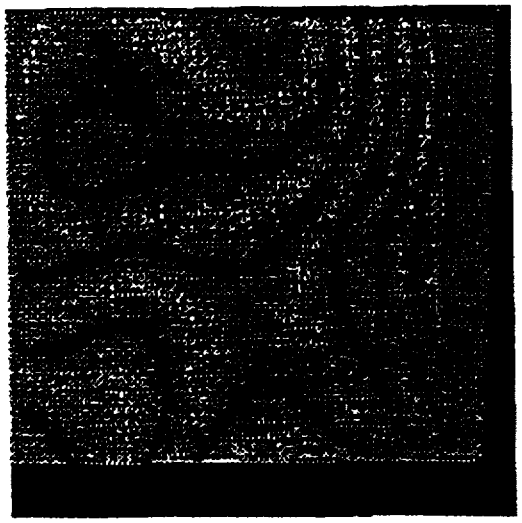
FIGS. 14(a)–14(d) show phase function measurement of the phase object: (a) the interference fringes after inserting the phase object in the optical system; (b) interference pattern after correction by driving the LCD; (c) the driven pattern on the LCTV; and (d) the 3-D plot of the phase conjugate.
Figure 14B:
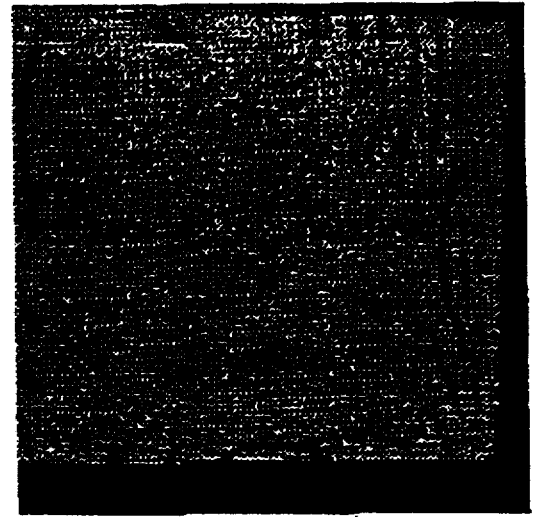
Figure 14C:
Figure 14D:
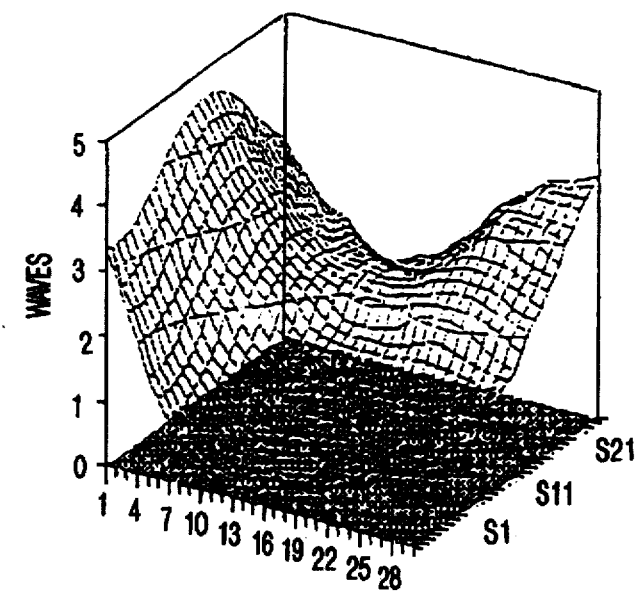

With reference to FIG. 12, an alternate embodiment of the present invention, an LCD 122 is placed in one path of a Twyman-Green type interferometer 110 to measure the phase variation across an interference wave 137. In this embodiment, the system is rearranged so the wave passes through phase object 130 only once. Most of the components in this arrangement have the same functions as in FIG. 8. The difference is that a reflector 132 and a splitter 136 were added to allow a single pass measurement of phase object 130.

After a wave input source 112 generates an input wave 114, a splitter 116 divides the wave into two waves, 121 and 127. Wave follows the path from splitter 116 through polarizers 126 and 134, through the phase object 130, and reflectors 128 and 132. When the wave passes through phase object 130, it becomes a distorted wave 131. The other divided wave 121 is directed through a polarizer 118 and a halfwave plate 120, then through liquid crystal device 122 and off of a reflector 124 and back through the aforementioned components, creating a distorted wave 125. The two distorted waves, 125 and 131, meet at splitter 136 and are combined, forming an interference wave 137. This interference wave 137 is focused by lens 138 through spatial filter 140 and imaged through lens 142 onto detector 144, preferably a charged coupled device (CCD) camera. A data processor 148 receives signal 146 of the detected interference pattern and performs functions to determine the conjugate phase of interference wave 137. This signal is sent to LCD 122, which in response modifies its refractive index, thus correcting the distortion.

The separations between splitter 116 and reflector 128 and between splitter 136 and reflector 132 are nearly the same as the separation between splitter 116 and reflector 124 to keep the best coherence condition for these two beams so that a good contrast of the interference fringes is obtained.

Figure 16:
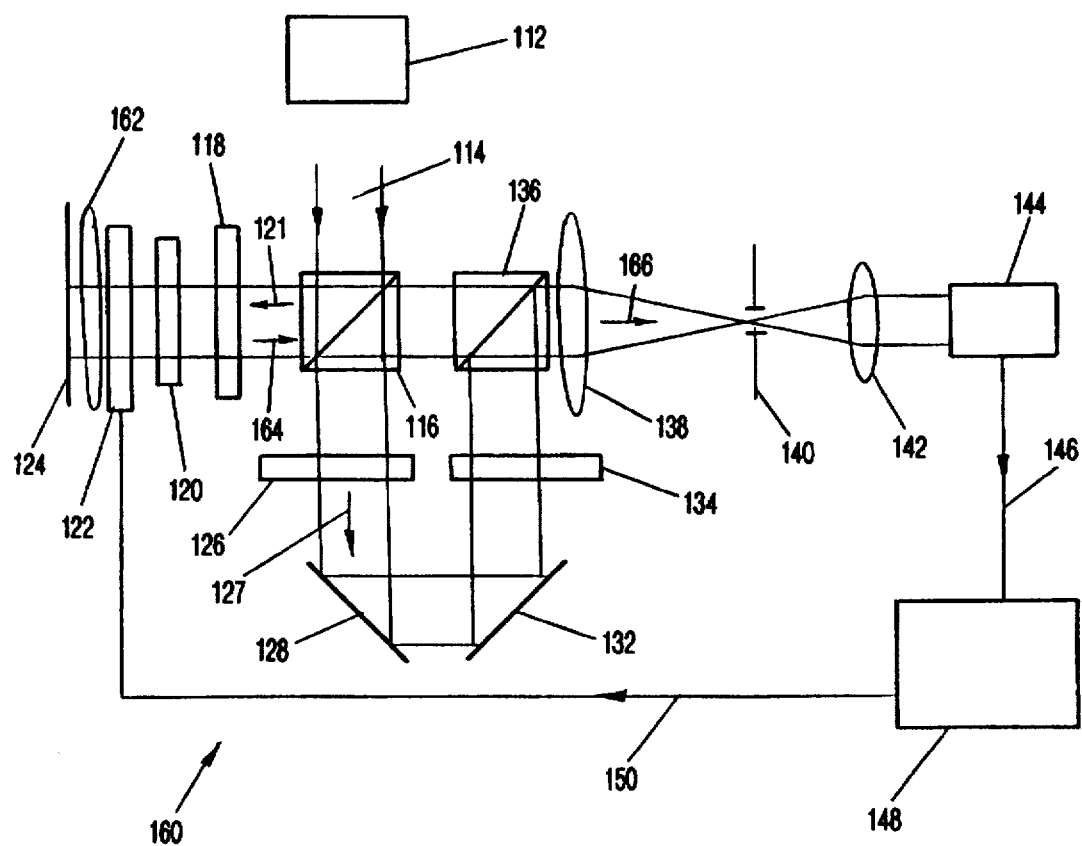
FIG. 16 is a diagram of a modified Twyman-Green interferometer for measurement of phase object in a double pass.
Figure 17A:
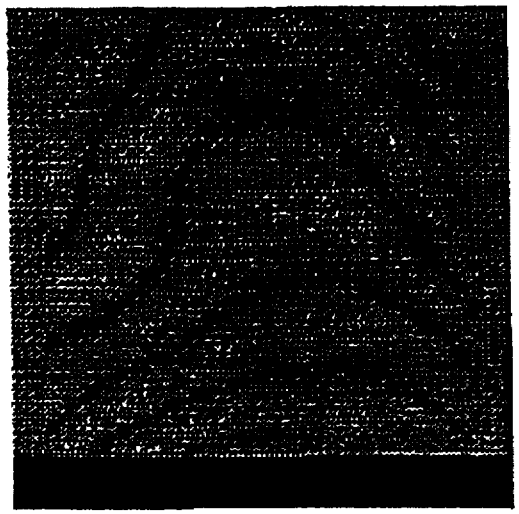
FIGS. 17(a)–17(d) show the calibration measurement of the experimental system: (a) the interference fringes of the optical system; (b) interference pattern after correction by driving the LCD; (c) the driven pattern on the LCD; and (d) the 3-D plot of the phase conjugate.
Figure 17B:
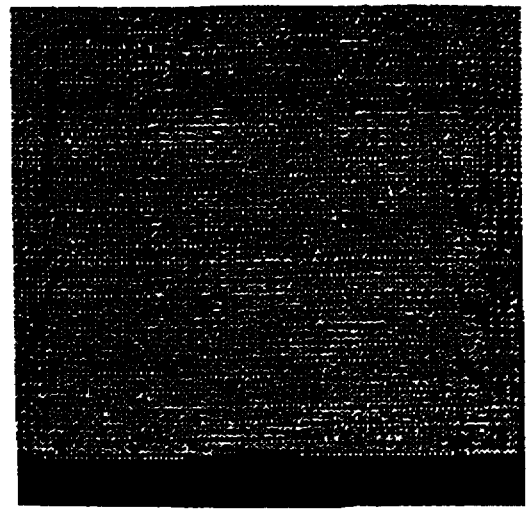
Figure 17C:
Figure 17D:
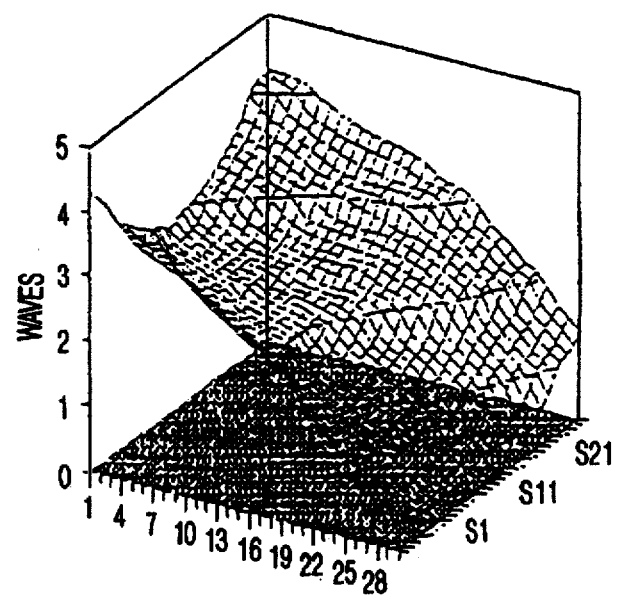
Figure 18A:
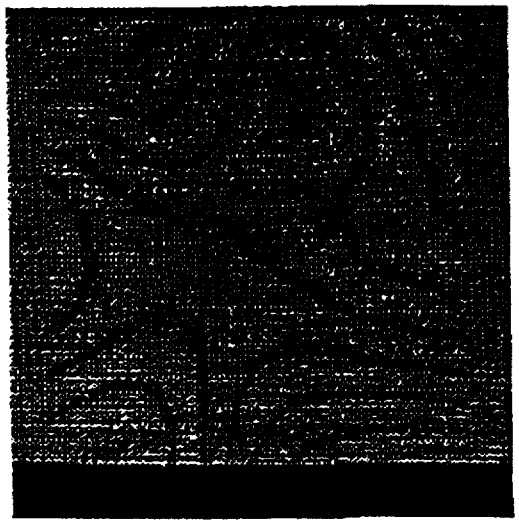
FIGS. 18(a)–18(d) show phase function measurement of the phase object: (a) the interference fringes after inserting the phase object in the optical system; (b) interference pattern after correction by driving the LCD; (c) the driven pattern on the LCD; and (d) the 3-D plot of the phase conjugate.
Figure 18B:
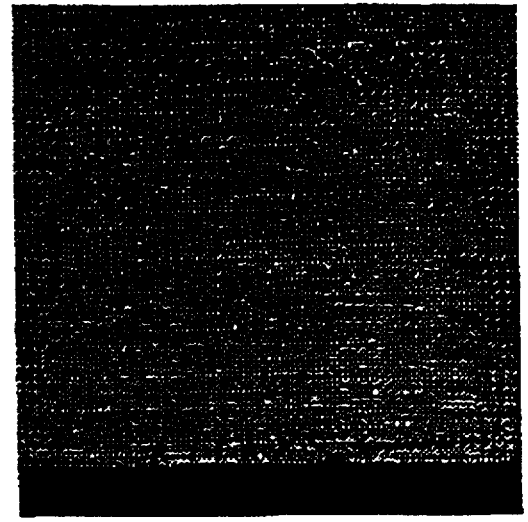
Figure 18C:
Figure 18D:
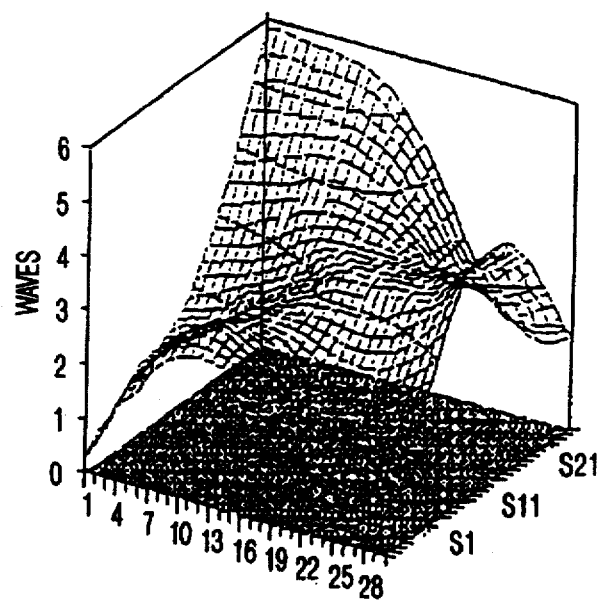

With reference to FIG. 16, an alternate embodiment of the present invention, LCD 122 is placed in one path of a Twyman-Green type interferometer to measure the phase variation across a wavefront. This embodiment is similar to that shown in FIG. 12, and components with comparable functions are given the same reference number. In this embodiment, however, the system 160 is rearranged so that one of the two waves split from input wave 114 passes through the phase object 162 twice. This results in a distorted wave 164 that gets combined with divided wave 127, generating interference wave 166. And, as in FIG. 12, the components perform the same functions in measuring and correcting the distorted wave.

EXAMPLES (INDUSTRIAL APPLICABILITY)

The invention is further illustrated by the following non-limiting examples.

Example 1

Figure 3A:
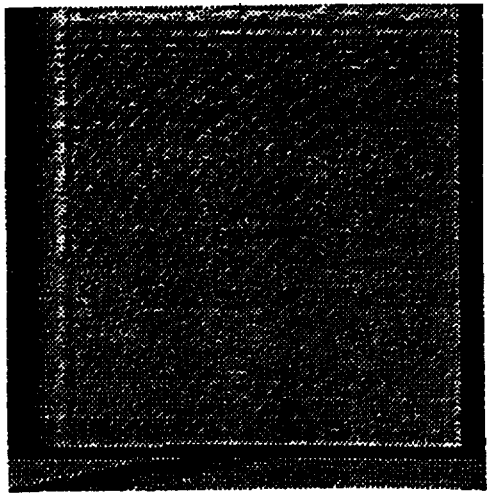
FIGS. 3(a)–3(d) depict the reference plane wave, the interference fringes of the optical system, the interference pattern after correction, and the driven pattern of the LCD.
Figure 3C:
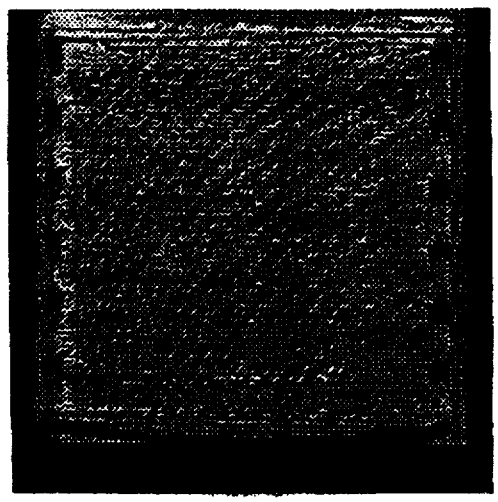
Figure 3B:
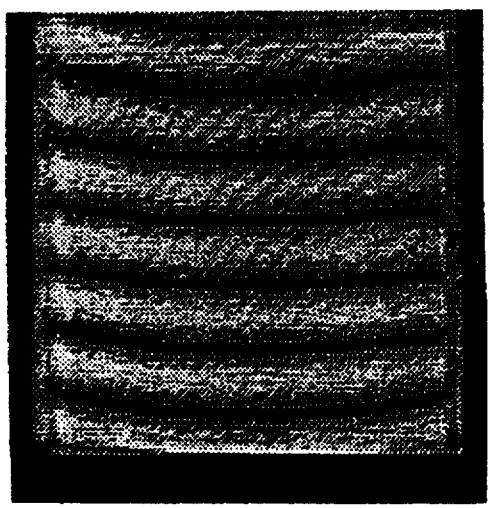
Figure 3D:
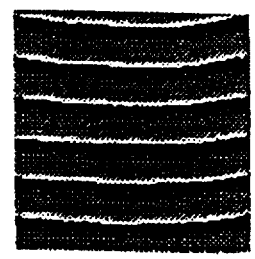
Figure 4:
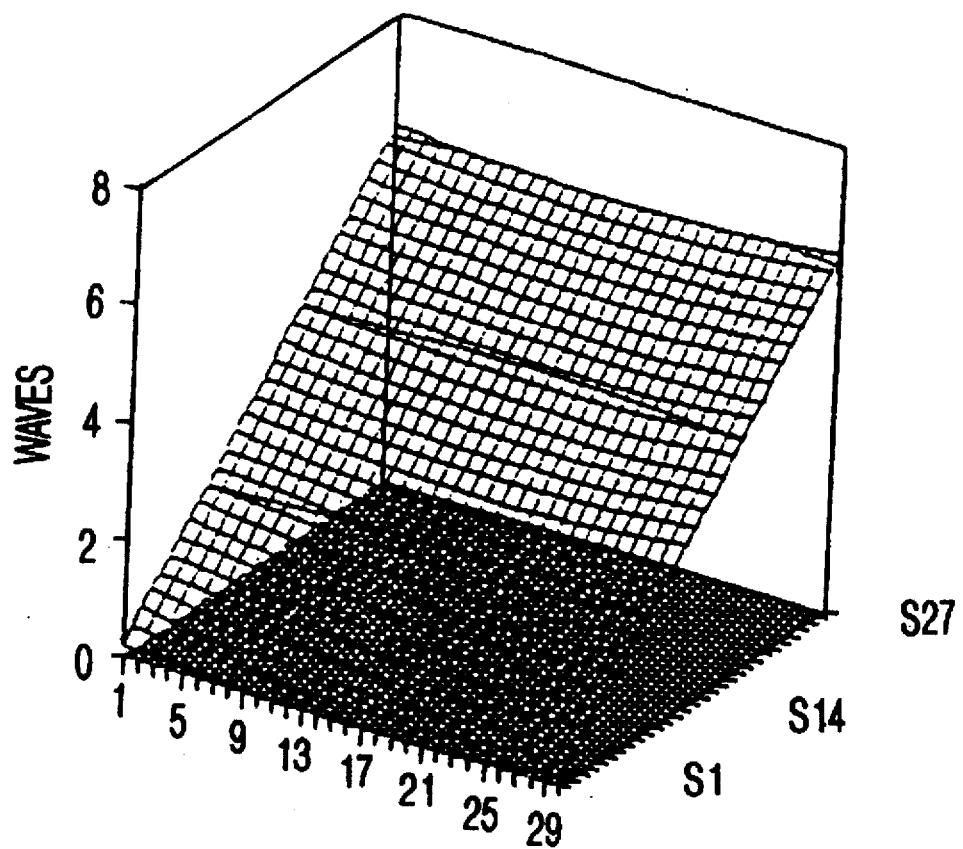
FIG. 4 illustrates the 3-D plot of the tilted wavefront using a 30×30 grid to represent the 1 cm² aperture.

With the configuration as shown in FIG. 1, when the optical path with the LCD was blocked, a reference plane wave as shown in FIG. 3(a) was detected on the camera. The image of a plane wave is supposed to be a uniform brightness plane. However, FIG. 3(a) shows the weak fringes on the image which are caused by the imperfection of the optical components in the system. The LCD aperture was reduced to approximately a 1 cm square containing the central 128×128 pixels. If the phase object is not inserted, the interference pattern from the two paths contains approximately straight fringes from a tilted plane wave, as shown in FIG. 3(b). After driving the LCD, the tilt phase was corrected, and an untilted plane wave was obtained as shown in FIG. 3(c). The driven pattern on the LCD is shown in FIG. 3(d) in terms of the gray levels that produced the required phase shift. The central 128×128 pixels of the LCD were driven with a 128×128 array of gray levels. The data of the driven gray level pattern was converted into the phase values which were used to plot the wavefront phase map in terms of the number of waves as shown in FIG. 4 which, as expected, is a tilted plane wavefront.

Figure 2:
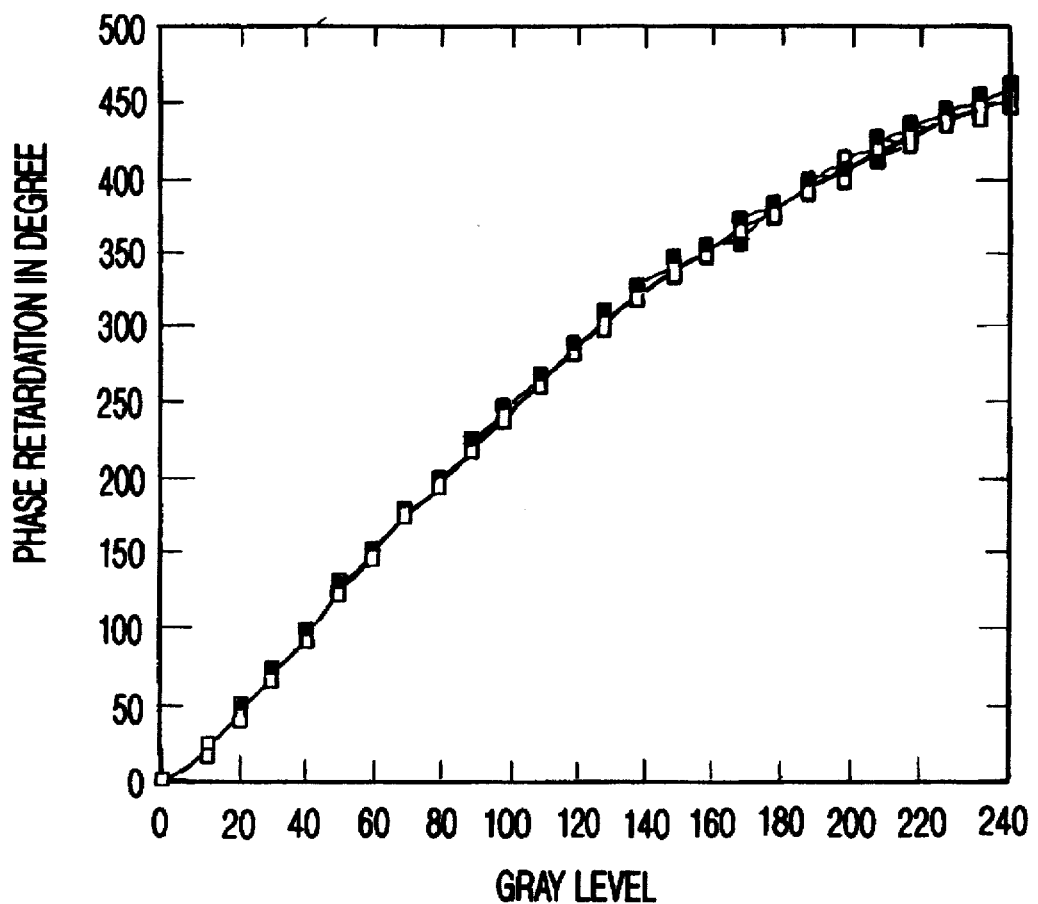
FIG. 2 plots the phase retardation property of a liquid crystal TV (LCD)
Figure 5A:
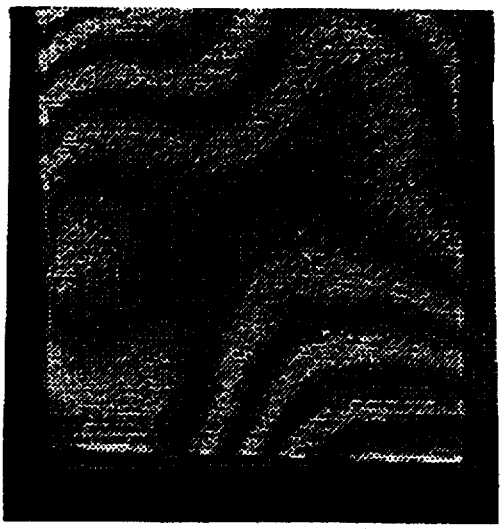
FIGS. 5(a)–5(c) shows the interference fringes of the phase object, the interference pattern after correction, and the driven pattern on the LCD.

After calibrating the system, a phase object was inserted in front of the LCD. This created a distorted wavefront and produced an interference pattern as shown in FIG. 5(a). To correct the interference pattern, the phase retardation properties of the LCD were measured. Using an Epson LCD from the Epson Crystal Image Video Projector, the phase retardation properties were measured as shown in FIG. 2. The LCD produced a $2\pi$ phase shift corresponding approximately to driven gray level 160. The function relating the phase retardation property of the LCD to the driven gray level was not linear, but close to a linear relation. However, for simplicity, a linear approximation was used to get the relation between the driving gray level of the LCTV and the phase function:

$$g(x,y) = \frac{\Phi(x,y)}{\pi} 80,$$

where $\Phi(x,y)$ is the measured phase function from the phase object. If the starting gray level function of the LCD is $g_0(x,y)$, then updating the gray level function to $$g(x,y)_\pm = g_0(x,y) + \frac{\Phi(x,y)}{\pi} 80$$

will correct the phase distortion and erase all fringes. Since there are two possible update gray levels, both levels were tried and the one with the larger detected irradiance I(x,y) was chosen. The error caused by the linear approximation was overcome with an iterative algorithm:

$$g_{k+1,\pm}(x,y) = g_k(x,y) \pm \frac{80}{\pi} \cos^{-1}\left(2\frac{I_k(x,y) - I_l}{I_h - I_l} - 1\right)$$

where $g_k(x,y)$ is the one of $g_{k,+}(x,y)$ and $g_{k,-}(x,y)$ which produced the larger irradiance $I_k(x,y)$ in a given iteration. The iteration proceeded with k=1, 2, . . . , n, until it converged to $g_{n+1}(x,y)=g_n(x,y)$. Thus, all phase distortions were corrected and a theoretically perfect plane wavefront was obtained.

Figure 5B:
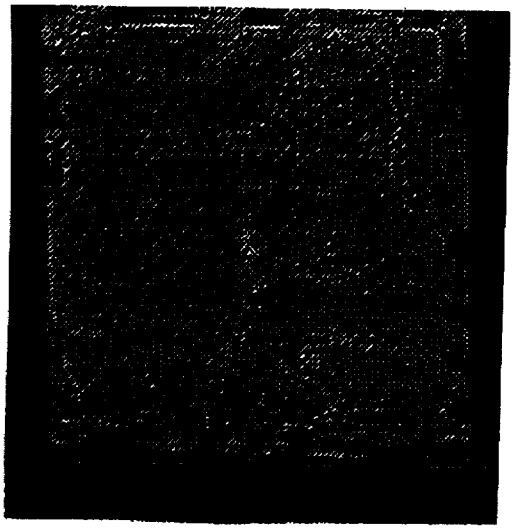
Figure 5C:
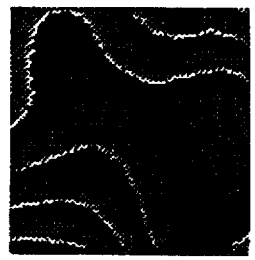
Figure 6:
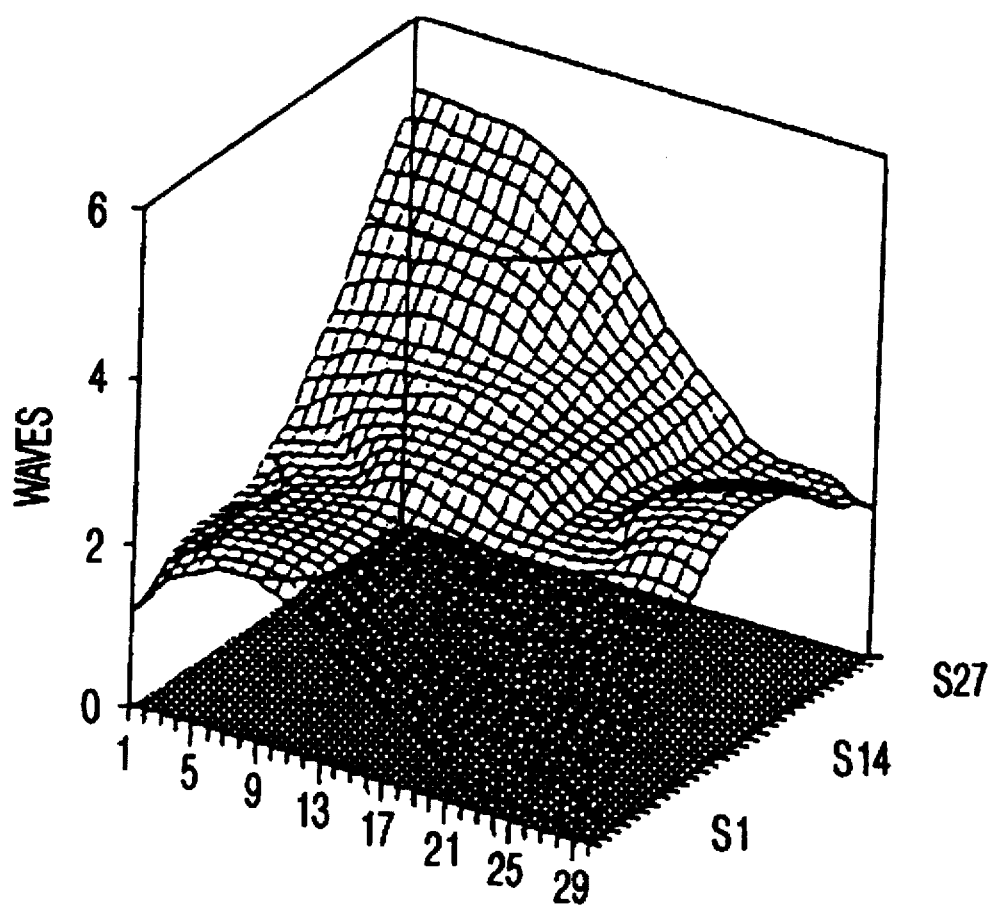
FIG. 6 depicts the 3-D plot of the wavefront of a phase object using a 30×30 grid to represent the 1 cm² aperture.
Figure 7A:
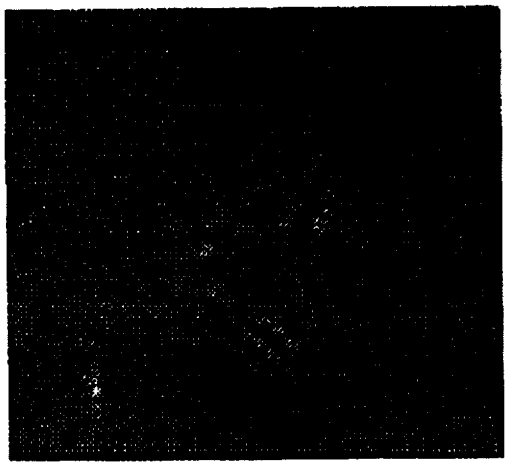
FIGS. 7(a) and 7(b) show the point spread function of the measured wavefront before and after correction.
Figure 7B:
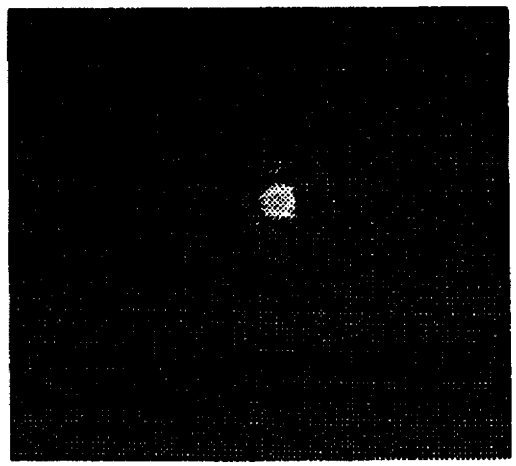

The interference pattern after correction is shown in FIG. 5(b). FIG. 5(c) shows the driven pattern of the LCD. The dark points and lines in FIG. 3(c) and FIG. 5(b) for the images after correction were due to edge blurring caused by slight undersampling by the LCD drive electronics. FIG. 6 shows the 3-D plot of the wavefront from the measured data in FIG. 5(c). FIG. 7(a) illustrates the point spread function of the seriously distorted wavefront before the correction and FIG. 7(b) shows the point spread function after correction, which is close to the diffraction limit.

Example 2

With the configuration as shown in FIG. 8, assuming wave 69 on CCD camera 86 is $\vec{u}_1(x,y)=\vec{A}_1 e^{j\Phi_1(x,y)}$ with LCD 72 in the off state and without inserting the phase object, and wave 67 is $\vec{u}_2(x,y)=\vec{A}_2 e^{j\Phi_2(x,y)}$ these two waves 67,69 will interfere and the irradiance on CCD camera 86 is:

$$\begin{aligned} I(x,y) &= |\vec{u}_1(x,y) + \vec{u}_2(x,y)|^2 \\ &= (\vec{A}_1 e^{j\Phi_1(x,y)} + \vec{A}_2 e^{j\Phi_2(x,y)})(\vec{A}_1 e^{-j\Phi_1(x,y)} + \vec{A}_2 e^{-j\Phi_2(x,y)}) \\ &= C_1 + C_2 \cos[\Phi_1(x,y) - \Phi_2(x,y)] \end{aligned}$$

where $$C_1 = |\vec{A}_1|^2 + |\vec{A}_2|^2$$

$$C_2 = 2\vec{A}_1 \vec{A}_2$$

are constants. By driving LCD 72 with the phase function $\Phi_L(x,y)$, the irradiance on CCD camera 86 is $$\begin{aligned} I(x,y) &= |\vec{A}_1 e^{j(\Phi_1(x,y)+\Phi_L(x,y))} + \vec{A}_2 e^{j\Phi_2(x,y)}|^2 \\ &= C_1 + C_2 \cos[\Phi_L(x,y) + \Phi_1(x,y) - \Phi_2(x,y)] \end{aligned}$$

where LCD 72 is assumed to have a uniform transmittance. When LCD 72 is driven with function $\Phi_L(x,y)=\Phi_2(x,y)-\Phi_1(x,y)$, the irradiance on CCD camera 86 is uniform and the interference fringes are erased. The method to obtain the phase function $\Phi_L(x,y)$ has been described in Example 1. This process finishes the calibration of the system.

The experimental results of the calibration are shown in FIG. 9. FIG. 9(a) shows the interference pattern of the system due to tilt and imperfection of the optical components. After driving LCD 72, the phase compensation was obtained. The uniform irradiance on the CCD camera 86 is shown in FIG. 9(b) where the dark lines in the image are due to the edge blurring caused by slight undersampling by the LCD drive electronics. The driven pattern on the LCD is shown in FIG. 9(c) in terms of the gray levels that produced the required phase shift. The normal way to drive a LCD in phase mode is to adjust the brightness control to the minimum (the brightness control ranges from 0 to 10) on the LCD driver to achieve the maximum phase retardation ability. For the LCD used in this example, the phase is retarded $2\pi$ corresponding to driving gray level 150 (the gray level ranges from 0 to 255) for a single pass in the above condition. For this double pass experimental arrangement, the $2\pi$ phase shift corresponds to the driving gray level 75. Because of this lower gray level, the quantization of the phase modulation into fewer levels gives poorer experimental results. To increase the quantization level of the phase modulation, the brightness control of the LCD driver was adjusted to 6 to make the phase shift of $2\pi$ correspond to driving gray level 150 in this double pass experiment. The central 128×128 pixels of the LCD were driven with a 128×128 array of gray levels. The data of the driven gray level pattern was converted into the phase map values which were used to plot the wavefront phase map in terms of the number of waves as shown in FIG. 9(d).

Once the system was calibrated, that is, the function $\Phi_L(x,y)$ was obtained, a phase object with the phase function $\Phi_o(x,y)$ was inserted in a position very close to the LCD as shown in FIG. 8. In this case the irradiance on CCD camera 86 is $$I(x,y) = |\vec{A}_{10}e^{j[\Phi_1(x,y)+\Phi_{LC}(x,y)+2\Phi_o(x,y)]} + \vec{A}_{20}e^{j\Phi_2(x,y)}|^2 \qquad \text{Eq. A}$$

$$= C_1 + C_2\cos[\Phi_{LC}(x,y) + 2\Phi_o(x,y) + \Phi_1(x,y) - \Phi_2(x,y)]$$

where the phase function $\Phi_o(x,y)$ is multiplied by a factor 2 due to the double pass through the phase object. If one drives the LCD with function $$\Phi_{LC}(x,y)=\Phi_2(x,y)-\Phi_1(x,y)-2\Phi_o(x,y)$$

to erase the interference fringes, the phase function of the phase object is obtained as $$\Phi_o(x,y) = \frac{1}{2}[\Phi_2(x,y) - \Phi_1(x,y) - \Phi_{LC}(x,y)] \qquad \text{Eq. B}$$

$$= \frac{1}{2}[\Phi_L(x,y) - \Phi_{LC}(x,y)]$$

Figure 10A:
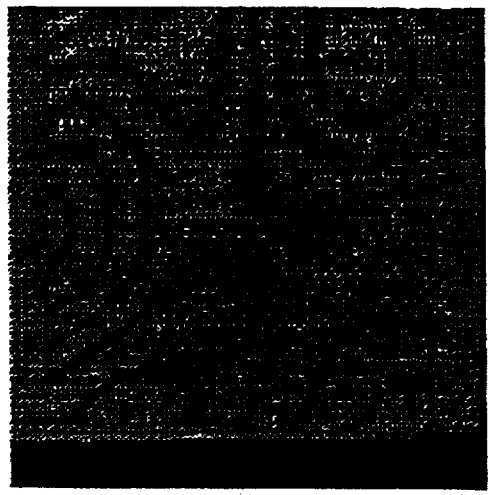
FIGS. 10(a)–10(d) show phase function measurement of the phase object: (a) the interference fringes after inserting the phase object in the optical system; (b) interference pattern after correction by driving the LCD; (c) the driven pattern on the LCTV; and (d) the 3-D plot of the phase conjugate.
Figure 10B:
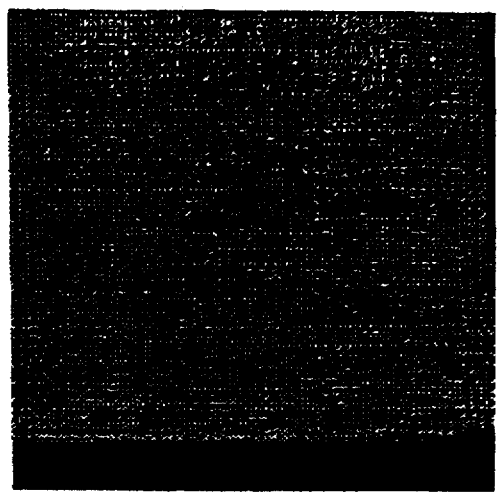
Figure 10C:
Figure 10D:
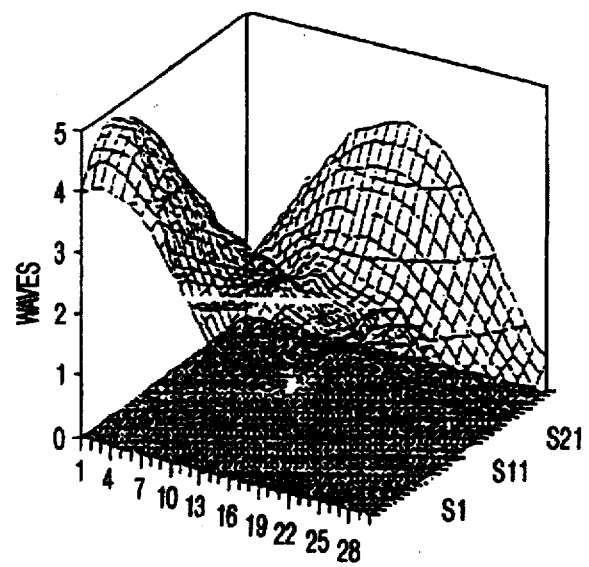
Figure 11:
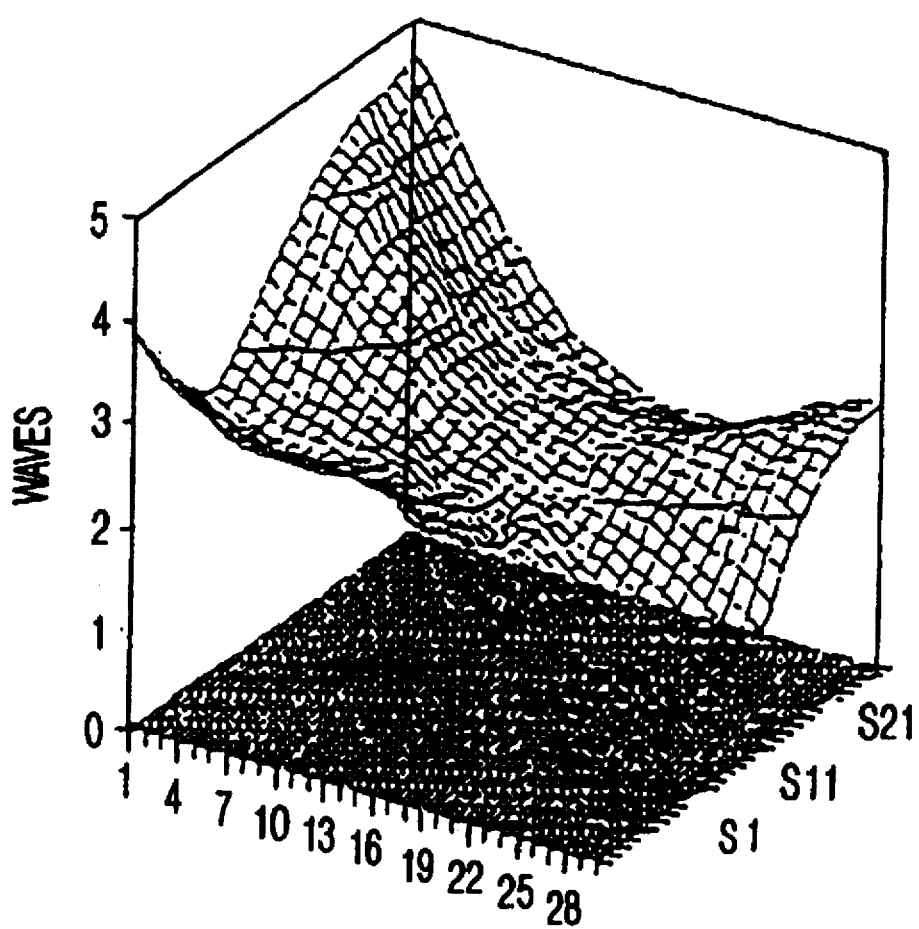
FIG. 11 is a 3-D plot of the phase function of the phase object using a 30×30 grid to represent the 1 cm² aperture.

The results are shown in FIG. 10, where FIG. 10(a) shows the interference pattern of the distorted wavefronts from both paths of the interferometer. After driving the LCD, the phase compensation was obtained, and the uniform irradiance on CCD camera 86 is shown in FIG. 10(b). The driven pattern on the LCD is shown in FIG. 10(c) in terms of the gray levels that produced the required phase shift. The data of the driven gray level pattern in FIG. 10(c) were converted into the phase values which were used to plot the wavefront phase map in terms of number of waves as shown in FIG. 10(d). (Note that the plot of the wavefront in FIG. 3(d) is not the phase function of the phase object.) By performing the operation of Eq. B, i.e., using the wavefront in FIG. 9(d), subtracting the wavefront in FIG. 10(d), and then dividing by 2, the phase function of the phase object is obtained which is plotted in FIG. 11.

Example 3

With the configuration as shown in FIG. 12, the Twyman-Green interferometer is set up so that the wave only makes a single pass through the phase object to be measured. The calibration measurement procedure was the same as in Example 2 and the results are shown in FIG. 13. After calibration, the same phase object was inserted in a position between reflectors 128 and 132. The measured results are shown in FIG. 14. To obtain the phase function of the phase object new equations must be used because the experimental arrangement is changed. In this case the irradiance on the CCD camera can be expressed as $$I(x,y) = |A_{10}e^{j[\Phi_1(x,y)+\Phi_{LC}(x,y)]} + A_{20}e^{j[\Phi_2(x,y)+\Phi_o(x,y)]}|^2$$

$$= C_1 + C_2\cos[\Phi_{LC}(x,y) + \Phi_1(x,y) - \Phi_o(x,y) - \Phi_2(x,y)]$$

and the phase function of the phase object is obtained as $$\Phi_o(x,y) = \Phi_{LC}(x,y) + \Phi_1(x,y) - \Phi_2(x,y)$$

$$= \Phi_{LC}(x,y) - \Phi_L(x,y).$$

Figure 15:
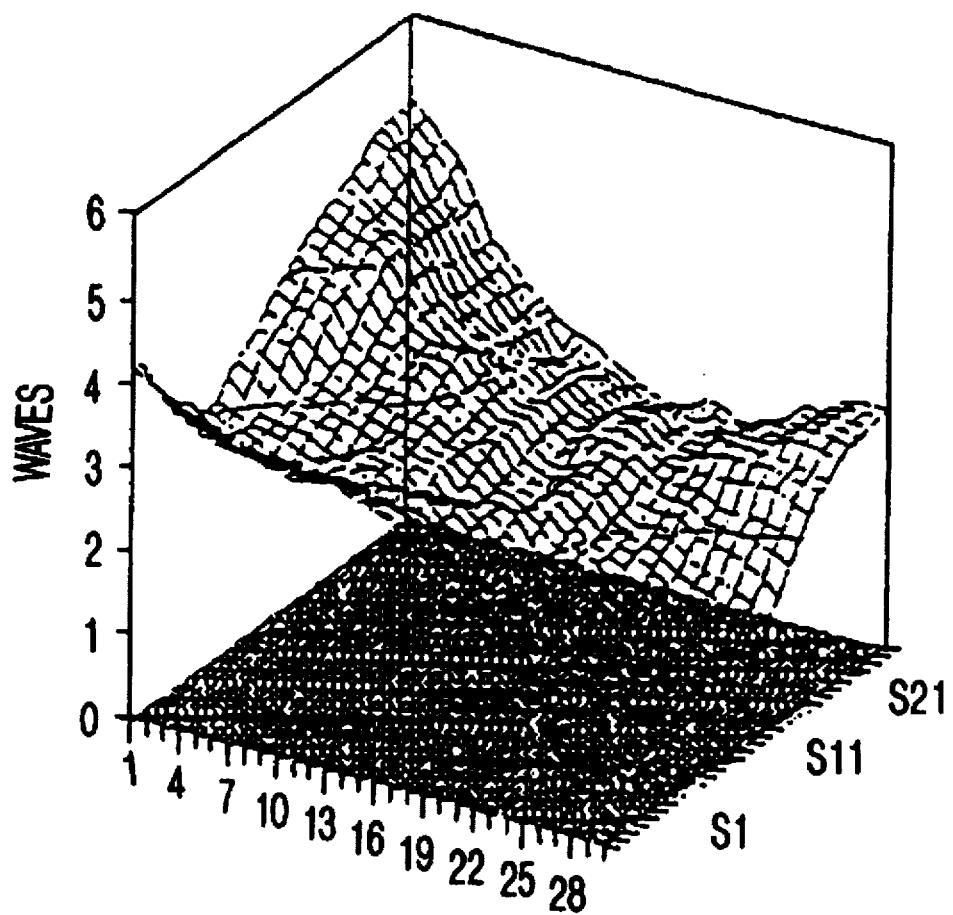
FIG. 15 is a 3-D plot of the phase function of the phase object using a 30×30 grid to represent the 1 cm² aperture.

The 3-D plot of the measured phase function is given in FIG. 15. Note that in this measurement the phase object and the LCD were not located in the same path in the interferometer.

Example 4

Figure 19:
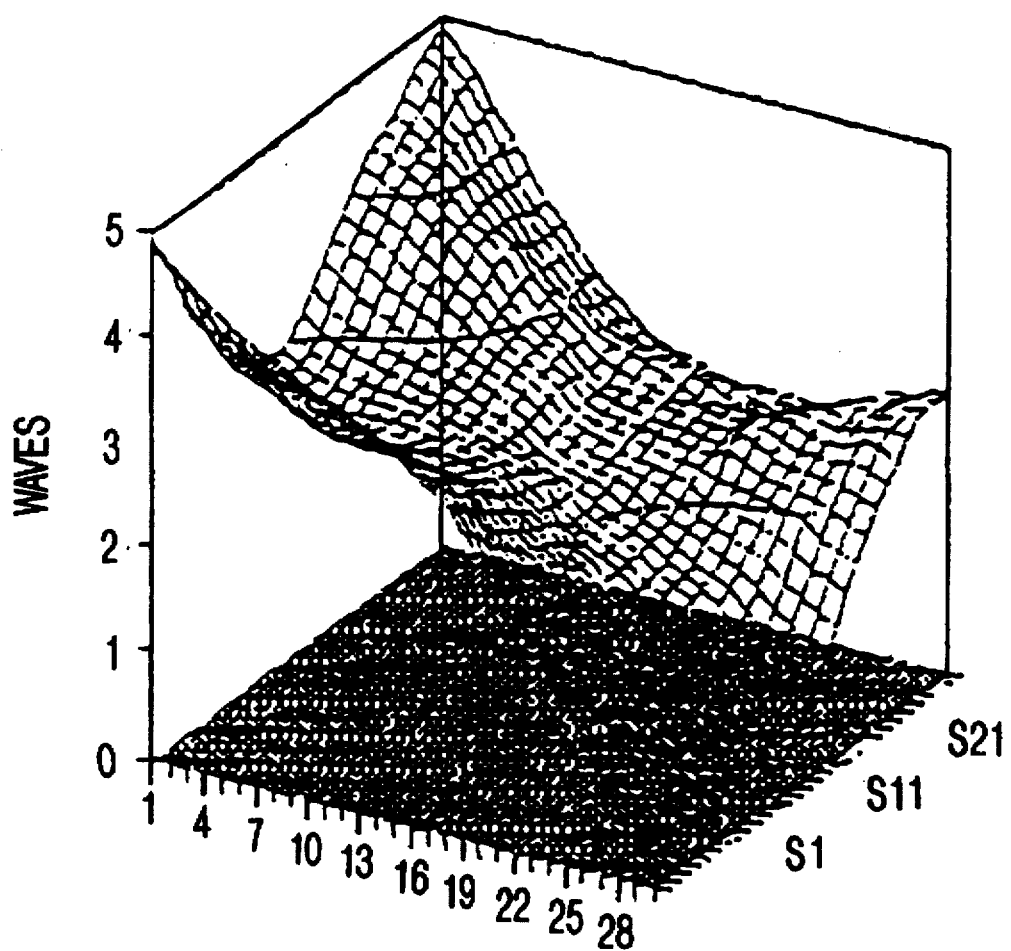
FIG. 19 is a 3-D plot of the phase function of the phase object using a 30×30 grid to represent the 1 cm² aperture.

With the configuration shown in FIG. 16, the Twyman-Green interferometer was set up so that the wave makes a double pass through the phase object to be measured. The phase object was inserted in the same path where the LCD is located as shown in FIG. 16. With the same experimental procedures as above, the calibration measurement results are shown in FIG. 17 and the phase object measurement results are shown in FIG. 18, respectively. In this set up, Eq. A and Eq. B from Example 2 were needed because the phase object and the LCD were located in the same path. The 3-D plot of the measured phase function of the phase object is shown in FIG. 19.

Although the invention has been described with reference to these preferred embodiments, other embodiments can achieve the same results. Variations and modifications of the present invention will be obvious to those skilled in the art and it is intended to cover in the following claims all such modifications and equivalents. The entire disclosures of all applications, patents, and publications cited above, and of the corresponding applications are hereby incorporated.

What is claimed is:

1. An adaptive optics system comprising:

means for detecting an irradiance and determining a phase of an input wave;

means for variably distorting the phase of the input wave comprising a liquid crystal device;

means for analyzing said detecting means and changing said variably distorting means; and means for directing the input wave through said variably distorting means in a single direction only and to said detecting means.

2. An adaptive optics system as recited in claim 1, wherein said detecting means comprises a camera.

3. An adaptive optics system as recited in claim 2, wherein said camera comprises a charge coupled device camera, said charge coupled device camera providing an electrical output to said analyzing and changing means.

4. An adaptive optics system as recited in claim 1, wherein said liquid crystal device comprises electrodes with nematic liquid crystal disposed therebetween.

5. An adaptive optics system as recited in claim 1, wherein said liquid crystal device comprises a pixel array having individual pixels, wherein each of said pixels is electrically driven by said analyzing and changing means, and wherein said liquid crystal device comprises liquid crystals in a fluid state of matter with orientation order having optical qualities of a uniaxial crystal and said liquid crystals respond to said electrically driven pixels causing a refractive index to change.

6. An adaptive optics system as recited in claim 5, wherein said orientation order of said liquid crystals is parallel to said pixel array.

7. An adaptive optics system as recited in claim 5, wherein said orientation order of said liquid crystals is perpendicular to said pixel array.

8. An adaptive optics system as recited in claim 1, wherein said means for analyzing said detecting means and changing said variably distorting means comprises computer means.

9. An adaptive optics system as recited in claim 1, wherein said directing means comprises a refractory system.

10. An adaptive optics system as recited in claim 1, further comprising wave propogation means.

11. An adaptive optics system as recited in claim 1, wherein the phase of the input wave is determined by calculating $$\Phi(x,y) = \pm\cos^{-1}\left(2\frac{I(x,y)-I_l}{I_h-I_l} - 1\right)$$

where $\Phi(x,y)$ is a phase of the input wave at point $(x,y)$ on a grid, $I(x,y)$ is a detected irradiance at point $(x,y)$, $I_h$ is a highest irradiance and $I_l$ is a lowest irradiance.

12. An adaptive optics system, comprising:
   a detector for detecting an irradiance and determining a phase of an input wave;
   a liquid crystal device for variably distorting the phase of the input wave;
   a data processor for analyzing said detector and changing said liquid crystal device; and
   a wave refractory system for directing the input wave in a single direction only through said liquid crystal device and to said detector.

13. A method for adapting a wave, the method comprising the steps of:
   (a) providing an input wave;
   (b) directing the input wave through, in a single direction only, a variably distorting mechanism comprising a liquid crystal device and to a detector;
   (c) detecting an irradiance and determining a phase of the input wave via the detector;
   (d) analyzing the detected phase of the input wave; and
   (e) variably distorting the phase of the input wave.

14. A method for adapting a wave as recited in claim 13, wherein the step of providing an input wave comprises providing a collimated input wave.

15. A method for adapting a wave as recited in claim 13, wherein the step of providing an input wave comprises providing a laser.

16. A method for adapting a wave as recited in claim 13, wherein the step of directing the input wave comprise the steps of:
   (a) splitting the wave into a pair of waves;
   (b) reflecting the pair of waves off of reflecting devices to a common point;
   (c) passing one of the pair of waves through a phase object and then the liquid crystal device before the wave reaches the common point;
   (d) recombining the pair of waves at the common point of reflection to form an interference wave; and
   (e) relaying the interference wave to the detector.

17. A method for adapting a wave as recited in claim 13, wherein the step of detecting a phase of the input wave comprises the steps of sensing an interferogram of the interference wave and outputting a signal corresponding to the phase of the input wave.

18. A method for adapting a wave as recited in claim 13, wherein the step of analyzing the detected phase of the input wave comprises the steps of:
   (a) receiving the detector output signal corresponding to the sensed phase of the input wave;
   (b) calculating the conjugate function of the sensed phase; and
   (c) outputting a signal corresponding to the calculated conjugate function.

19. A method for adapting a wave as recited in claim 18, wherein the step of variably distorting the phase of the input wave comprises the steps of receiving the output signal and changing the refractive index of the liquid crystal device to change the phase of the input wave.

20. A method for adapting a wave as recited in claim 13, wherein the step of detecting an irradiance and determining a phase comprises calculating $$\Phi(x,y) = \pm\cos^{-1}\left(2\frac{I(x,y)-I_l}{I_h-I_l} - 1\right)$$

where $\Phi(x,y)$ is a phase of the input wave at point $(x,y)$ on a grid, $I(x,y)$ is a detected irradiance at point $(x,y)$, $I_h$ is a highest irradiance and $I_l$ is a lowest irradiance.

21. A method for adapting a wave, comprising the steps of:
   (a) providing a collimated input wave;
   (b) splitting the input wave into two waves;
   (c) reflecting the waves toward a common point;
   (d) passing one of the waves through a phase object before reaching the common point, thereby generating a distorted wave;
   (e) passing the distorted wave through a liquid crystal device, in a single direction only, before reaching the common point, thereby modifying the phase of the distorted wave;
   (f) recombining the two waves at the common point, thereby creating an interference wave;
   (g) imaging the interference wave to a detector;
   (h) detecting an irradiance and determining a phase of the interference wave with the detector;
   (i) outputting a signal corresponding to the determined phase of the interference wave from the detector;
   (j) analyzing the detector output to determine a conjugate wave phase;
   (k) sending a signal corresponding to the conjugate wave phase from a computer means; and
   (l) receiving the sent signal from the computer means with the liquid crystal device, thereby causing the refractive index of the liquid crystal device to change, thereby modifying the phase of the wave.

22. A method of measuring and correcting a wave, comprising the steps of:
   (a) determining at each point $(x,y)$ on a grid a two-dimensional phase of an interference wave resulting from combining a reference wave and a distorted wave, wherein the reference wave and the distorted wave are split from an input wave;
   (b) driving a variably distorting device within the path of the distorted wave with the positive conjugate of the two-dimensional phase at each point $(x,y)$;
   (c) measuring the irradiance at each point $(x,y)$ of a second interference wave resulting from the combined reference wave and a second distorted wave produced by the variably distorting device driven by the positive conjugate of the phase;
   (d) driving a variably distorting device within the path of the distorted wave with the negative conjugate of the two-dimensional phase at each point $(x,y)$;
   (e) measuring the irradiance at each point $(x,y)$ of a third interference wave resulting from the combined reference wave and a third distorted wave produced by the variably distorting device driven by the negative conjugate of the phase;
   (f) selecting the phase function that produces the larger irradiance at each point $(x,y)$ between the measured irradiance of the second interference wave and the third interference wave; and (g) driving the variably distorting device with the selected phase function at each point (x,y) to correct the phase distortions.

23. A method of measuring and correcting an input wave as recited in claim 22, wherein the step of determining a two-dimensional phase of an interference wave comprises calculating $$\Phi(x,y) = \pm \cos^{-1}\left(2\frac{I(x,y) - I_l}{I_h - I_l} - 1\right)$$

where $\Phi(x,y)$ is a phase of the input wave at point (x,y) on a grid, $I(x,y)$ is a detected irradiance at point (x,y), $I_h$ is a highest irradiance and $I_l$ is a lowest irradiance.

24. A method of measuring and correcting an input wave as recited in claim 22, wherein the step of driving a variably distorting device comprises driving a liquid crystal device.

* * * * *